(12) United States Patent
Yamada

(10) Patent No.: US 8,070,085 B2
(45) Date of Patent: *Dec. 6, 2011

(54) PRETENSIONER

(75) Inventor: Taku Yamada, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 229 days.

This patent is subject to a terminal disclaimer.

(21) Appl. No.: 12/551,324

(22) Filed: Aug. 31, 2009

(65) Prior Publication Data

US 2010/0051734 A1 Mar. 4, 2010

(30) Foreign Application Priority Data

Sep. 4, 2008 (JP) .................................. 2008-227105
Aug. 6, 2009 (JP) .................................. 2009-183521

(51) Int. Cl.
*B65H 75/48* (2006.01)
(52) U.S. Cl. ....................................................... 242/374
(58) Field of Classification Search ................... 242/374
See application file for complete search history.

(56) References Cited

U.S. PATENT DOCUMENTS

| | | | | | |
|---|---|---|---|---|---|
| 5,842,344 | A | * | 12/1998 | Schmid ............................ | 60/632 |
| 6,299,090 | B1 | * | 10/2001 | Specht et al. ................. | 242/374 |
| 6,450,435 | B2 | * | 9/2002 | Junker et al. .................. | 242/374 |
| 7,793,982 | B2 | * | 9/2010 | Krauss ........................... | 280/806 |
| 2009/0134691 | A1 | * | 5/2009 | Choi et al. ..................... | 297/480 |

FOREIGN PATENT DOCUMENTS

| | | |
|---|---|---|
| CN | 1430561 A1 | 7/2003 |
| DE | 1960051 C1 | 6/1998 |
| DE | 102005050946 A1 | 4/2007 |
| DE | 102006045198 A1 | 4/2008 |
| JP | 2004-1656 A | 1/2004 |
| WO | 98/34817 A1 | 8/1998 |

OTHER PUBLICATIONS

Chinese Office Action issued on Feb. 16, 2011 in corresponding Chinese Application No. 200910172908.X.
Office Action dated Mar. 30, 2011 issued by the German Patent Office in corresponding German Patent Application No. 10 2009 040 064.8-22.

* cited by examiner

*Primary Examiner* — Sang Kim
(74) *Attorney, Agent, or Firm* — Roberts Mlotkowski Safran & Cole, P.C.

(57) ABSTRACT

A pretensioner is provided, which can be partially changed in mechanical strength of in a cylinder, in addition, can be widely used. In the pretensioner, the cylinder is molded by forging, and a positioning portion as a high-strength portion is formed from a partition formed using a excess portion produced during the forging-molding. Therefore, while an outer circumferential shape of the cylinder is not changed, a specification of the positioning portion can be varied, the specification including a formation position of the positioning portion, an extension dimension of the positioning portion from the cylinder, and thickness of the positioning portion along a through direction of the cylinder.

7 Claims, 10 Drawing Sheets

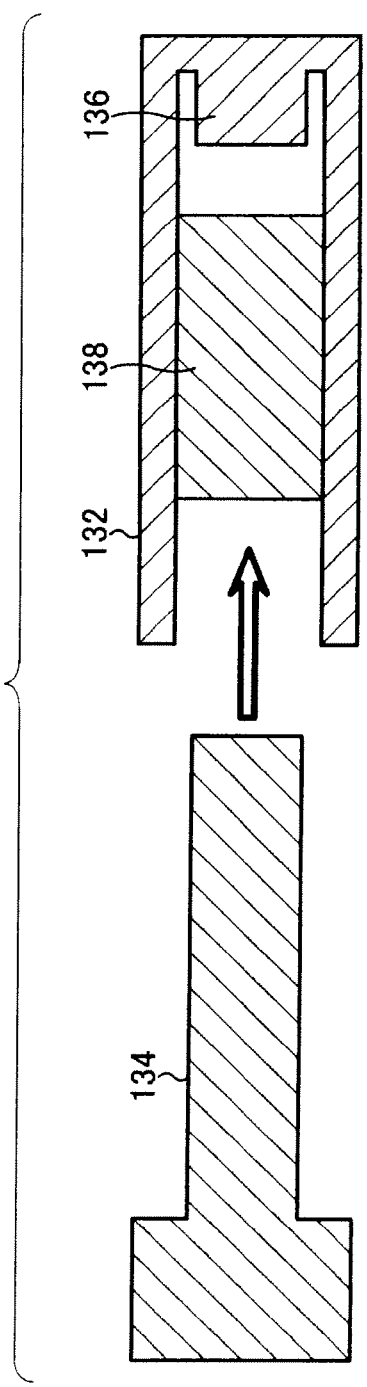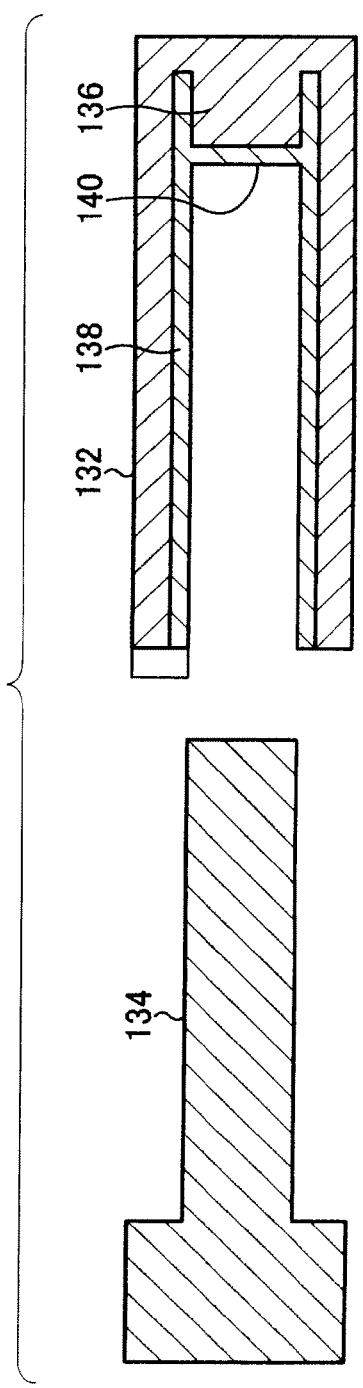

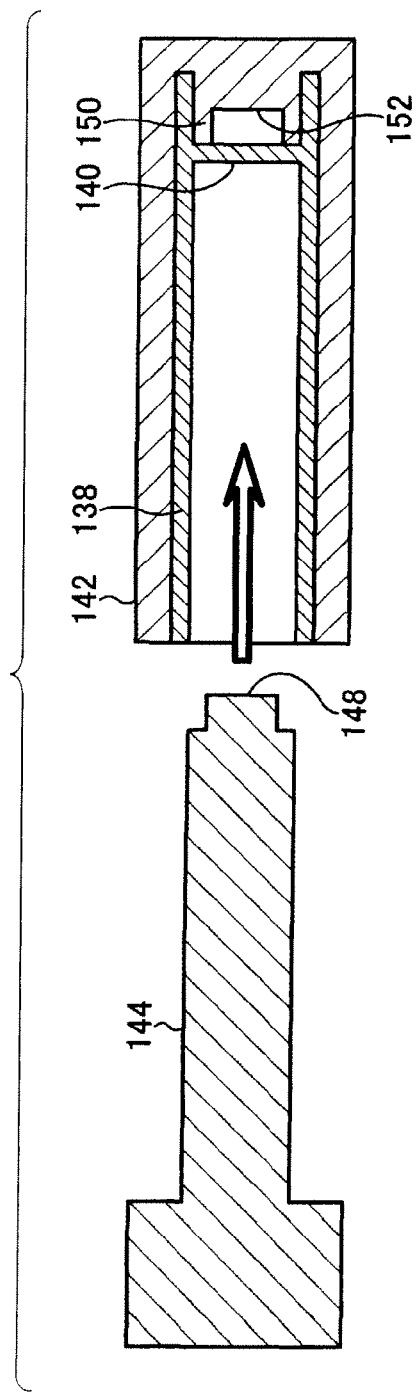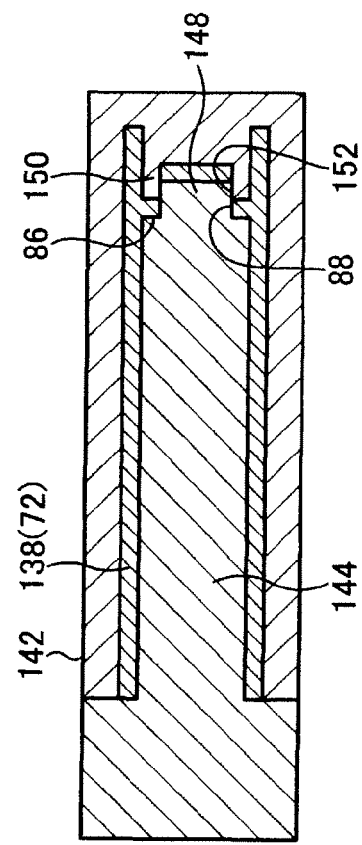
FIG.6A
FIG.6B

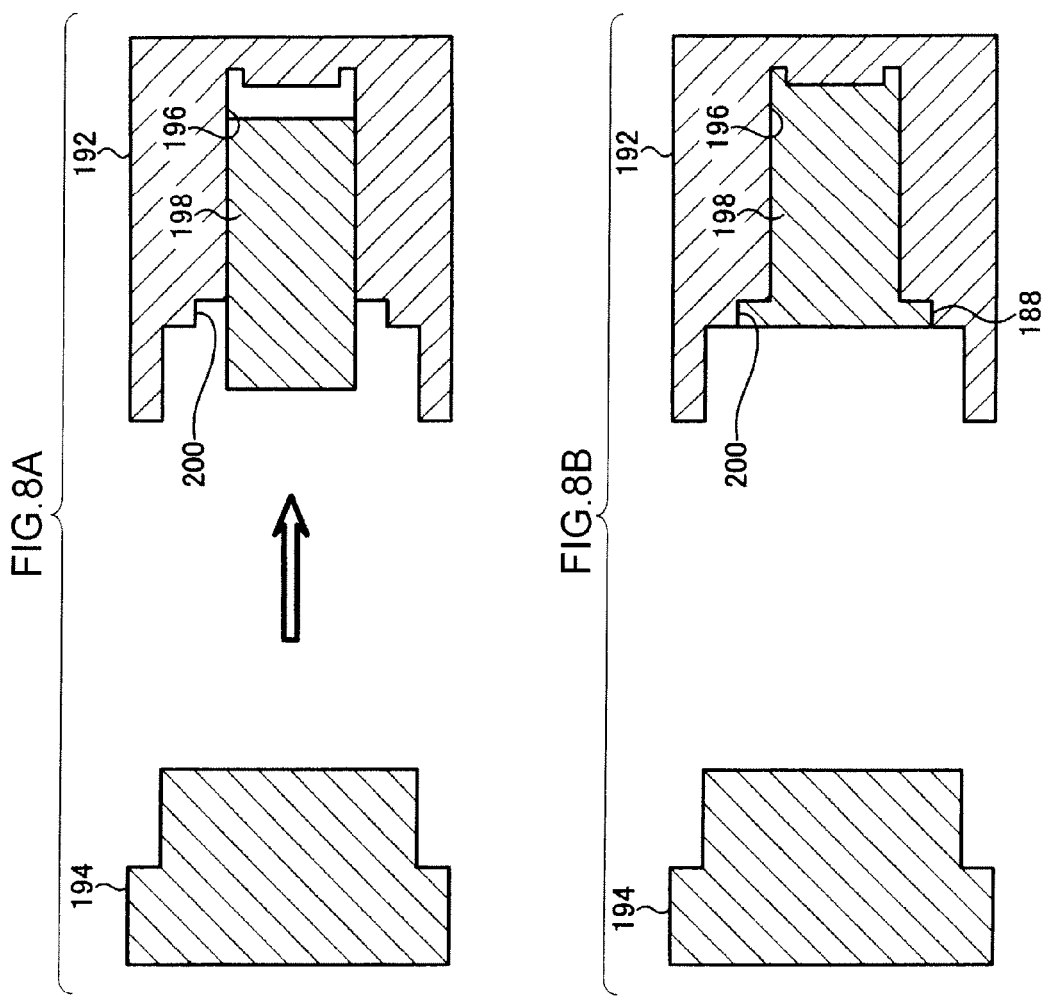

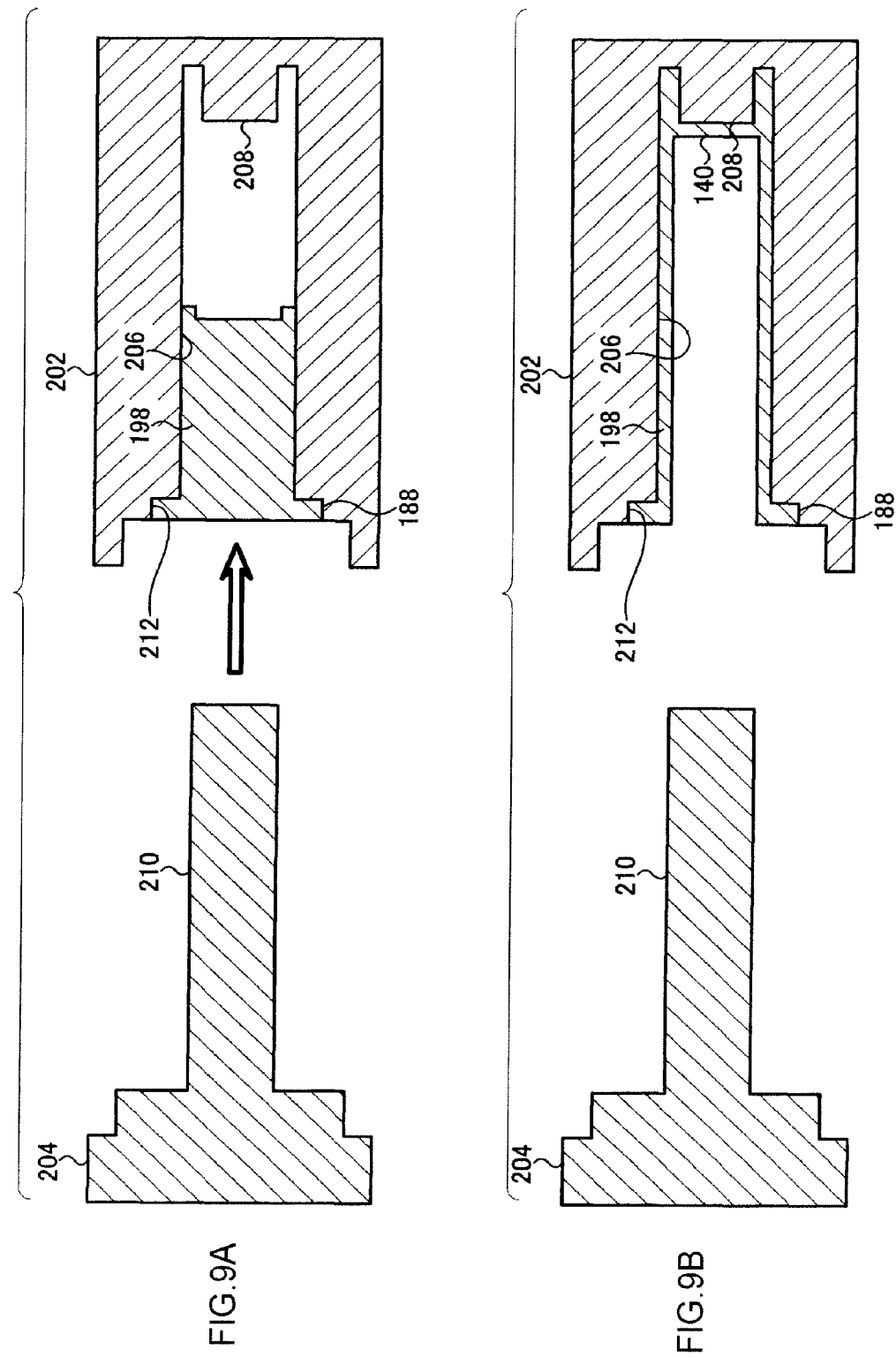

PRETENSIONER

CROSS-REFERENCE TO RELATED APPLICATION

This application claims priority under 35 USC 119 from Japanese Patent Applications No. 2008-227105 filed on Sep. 4, 2008 and No. 2009-183521 filed on Aug. 6, 2009, the disclosures of which are incorporated by reference herein.

BACKGROUND OF THE INVENTION

1. Field of the Invention

The present invention relates to a pretensioner that increases tension of a webbing belt configuring a seatbelt device of a vehicle in a vehicle rapid-deceleration state or the like.

2. Related Art

In a pipe for pretensioner (a configuration corresponding to the pipe is called "cylinder" in the present invention) disclosed in Japanese Patent Application Laid-Open (JP-A) No. 2004-1656, a seamless pipe which will to be a pretensioner pipe is subjected to pipe-expanding, thereby an inner diameter dimension of the pipe is partially expanded in order to form a portion for accommodating a gas generator, the region having a large inner diameter dimension compared with other regions.

Since a seamless pipe is subjected to such pipe-expanding, and thereby wall thickness of the seamless pipe may be partially changed, so mechanical strength of a pretensioner pipe may be partially changed. However, in such pipe-expanding, since the seamless pipe is pressurized from the inside to the outside of the pipe so that an inner diameter dimension is increased, so an outer diameter dimension is also changed. Therefore, a specification of a frame of a webbing winding device, the frame being mounted with a pretensioner pipe, needs to be changed for each specification of an inner diameter dimension of a pretensioner pipe, leading to low wide-usability.

SUMMARY OF THE INVENTION

In consideration of the fact, the present invention provides a pretensioner, which can be partially changed in mechanical strength of a cylinder, in addition, can be widely used.

A pretensioner according to a first aspect of the invention includes: a gas generation unit that is activated to generate gas; a cylinder that is formed into a cylindrical shape open at both ends, has the gas generation unit mounted thereto from one of the open ends, and is supplied with gas generated by the gas generation unit to the inside of the cylinder so that an internal pressure of the cylinder is increased, the cylinder having a high-strength portion that extends from an inner circumferential portion of the cylinder toward the center of the cylinder at a predetermined position between the one of the open ends and the other of the open ends such that a wall thickness of the cylinder is enlarged at the predetermined position; and a tension adding unit that is moved within the cylinder by gas pressure provided by the gas generation unit so as to increase a tension of a webbing belt configuring a seatbelt device.

In the pretensioner according to the first aspect of the invention, when the gas generation unit, which is mounted (fitted) to the cylinder from one of the open ends of the cylinder, is activated, gas is generated by the gas generation unit, and the gas is supplied into the cylinder. When the gas is supplied into the cylinder and thus internal pressure of the cylinder is increased in this way, the tension adding unit works to increase tension of the webbing belt configuring the seatbelt device. Thus, a passenger body wearing the webbing belt is further strongly restrained by the webbing belt.

A high-strength portion is extendedly formed from an inner circumferential portion of the cylinder toward the center side (an axial center) thereof at the predetermined position between one of the open ends of the cylinder and the other of the open ends. Since the high-strength portion is extended in this way, in a portion where the high-strength portion is formed, thickness of the cylinder is partially enlarged. Therefore, mechanical strength is increased in the portion where the high-strength portion is formed compared with other portions of the cylinder.

In addition, since the high-strength portion is extended from the inner circumferential portion of the cylinder, an extension dimension of the high-strength portion from the inner circumferential portion of the cylinder, and/or thickness of the high-strength portion along a through direction (axial direction) of the cylinder can be changed without changing an outer diameter dimension of the cylinder. Therefore, even if a specification of the high-strength portion, that is, the extension dimension of the high-strength portion from the inner circumferential portion of the cylinder, the thickness of the high-strength portion along the through direction of the cylinder, and the like is varied, because the outer dimension of the cylinder can be the same, the same specification can be used for a region where to be mounted with the cylinder, leading to high versatility.

In the pretensioner according to a second aspect of the invention in the first aspect of the invention, the high-strength portion is formed near a gas blow section that blows the gas in the gas generation unit fitted in the cylinder.

In the pretensioner according to the second aspect of the invention, the high-strength portion is extended from the inner circumferential portion of the cylinder near the gas blow section in the gas generation unit fitted in the cylinder. Therefore, high strength can be ensured against gas pressure inside of the cylinder being abruptly increased immediately after the gas generation unit is activated.

In addition, since the high-strength portion can ensure sufficiently high strength to withstand the high gas pressure immediately after the gas generation unit is activated, other portions of the cylinder can be reduced in thickness. Thus, the cylinder can be reduced in weight.

In the pretensioner according to a third aspect of the invention in the first or the second aspect, the cylinder is molded (formed) by forging of molding material.

In the pretensioner according to the third aspect of the invention, since the cylinder is molded by forging, when the high-strength portion is formed in the cylinder, the inner diameter dimension of the cylinder can be partially easily changed without changing the outer diameter dimension of the cylinder.

In addition, by the forging-molding, work hardening occurs in a molding material to be formed into the cylinder, thickness of the cylinder as a whole may be reduced, leading to reduction in weight of the cylinder.

Furthermore, since the cylinder can be formed using an inexpensive material compared with a stainless pipe member, cost of the cylinder can be reduced.

In the pretensioner according to a fourth aspect of the invention in the third aspect, a partition wall is formed (by using excess material of the molding material) at a position of the molding material corresponding to the predetermined position at the inside of the cylinder by forging-molding where the molding material is pressurized from at least one side of both sides of the molding material corresponding to the both ends of the cylinder, and the high-strength portion is formed from the partition wall.

In the pretensioner according to the fourth aspect of the invention, the partition wall is formed (by using excess material of the molding material) at the position of the molding material corresponding to the predetermined position at the inside of the cylinder by forging-molding where the molding material is pressurized from at least one side of both sides of the molding material corresponding to the both ends of the cylinder, and the high-strength portion is formed from the partition wall. Therefore, a shape of the high-strength portion extended from an inner circumferential portion of the cylinder may be easily formed.

In the pretensioner according to a fifth aspect of the invention in any one of the first aspect to the fifth aspect of the invention, it further includes a flange portion that is formed to extend from an outer circumferential portion of the cylinder so as to engage with a region to which the cylinder is mounted, a thickness of the flange portion being set to be larger than a wall thickness of a cylindrical main body portion of the cylinder.

In the pretensioner according to the fifth aspect of the invention, the flange portion is formed to extend from the outer circumferential portion of the cylinder, and by the flange portion engaging with a region in which the cylinder is mounted, for example, the cylinder is positioned.

In this case, the thickness dimension of the flange portion is set to be larger than the wall thickness of the cylinder in the cylindrical main body portion, and therefore, the mechanical strength of the flange portion is high, and for example, when the pretensioner is activated, the flange portion can withstand the reaction force from the region in which the cylinder is mounted. Furthermore, the thickness of the flange portion is made larger than that of the cylindrical main body portion of the cylinder, that is, even if the thickness of the flange portion is made larger, no increase in the wall thickness of the cylindrical main body portion is caused, or the increase in the wall thickness of the cylindrical main body portion is small. For this reason, even if a high mechanical strength is imparted to the flange portion, the cylinder can be made smaller and is reduced in the weight thereof.

In the aspect of the present invention, although the thickness of the flange portion is made larger than the wall thickness of the cylindrical main body portion in the cylinder, it suffices that the thickness of the flange portion may be set to be larger than the wall thickness of the cylindrical main body portion at an arbitrary position. That is to say, in a case in which the wall thickness of the cylindrical main body portion is configured to be different at positions, even if the thickness of the flange portion is smaller than the maximum wall thickness of the cylindrical main body portion, it suffices that the thickness of the flange portion is larger than the wall thickness of the cylindrical main body portion at portions other than the maximum wall thickness portion.

In the pretensioner according to a sixth aspect of the invention in the fifth aspect of the invention, the flange portion is molded (formed) by upsetting forging before the cylinder is formed into a cylindrical shape.

In the pretensioner according to the sixth aspect of the invention, the flange portion is molded at the cylinder by upsetting forging before the cylinder is molded into a cylindrical shape. As a result, the thickness of the flange portion can be arbitrarily set without being affected by the wall thickness of the cylinder in the cylindrical main body portion (or in the state of affection of the wall thickness of the cylinder in the cylindrical main body portion being suppressed). In this manner, due to the thickness of the flange portion being arbitrarily set, the thickness of the flange portion can be easily set to be larger than the wall thickness of the cylinder in the cylindrical main body portion.

In the pretensioner according to a seventh aspect of the invention in the first aspect of the invention, the high-strength portion includes a thick-walled portion formed at the one of the open ends where the gas generation unit is mounted, a wall thickness of the thick-walled portion being larger than a wall thickness of a cylindrical main body portion of the cylinder.

In the pretensioner according to an eighth aspect of the invention in the seventh aspect of the invention, an outer diameter of the thick-walled portion and an outer diameter of the cylindrical main body portion are the same, and an inner diameter of the thick-walled portion is smaller than an inner diameter of the cylindrical main body portion.

In the pretensioner according to the seventh and eighth aspects of the invention, the thick-walled portion (the high-strength portion) can be formed without changing an outer diameter dimension of the cylinder. Therefore, even if a specification of the high-strength portion is varied, because the outer dimension of the cylinder can be the same, the same specification can be used for a region where to be mounted with the cylinder, leading to high versatility.

As described hereinbefore, since the pretensioner according to the aspects of the invention can be partially changed in mechanical strength of the cylinder without changing an outer diameter dimension of the cylinder, a component to be assembled with the cylinder can be commonly used, leading to high versatility.

BRIEF DESCRIPTION OF THE DRAWINGS

An exemplary embodiment of the invention will be described in detail with reference to the following figures, wherein:

FIGS. 5A, 5B are views schematically showing a forging/molding step (a cylindrical body formation step) of the cylinder; and FIGS. 6A, 6B are views schematically showing a step of forming a restriction portion.

FIGS. 8A, 8B are view schematically showing an upsetting forging step in a forging/molding step of a cylinder;

FIGS. 9A, 9B are view schematically showing a cylindrical body formation step in the forging/molding step of the cylinder.

DESCRIPTION OF THE PREFERRED EMBODIMENT

Configuration of the First Exemplary Embodiment

Figure 3:
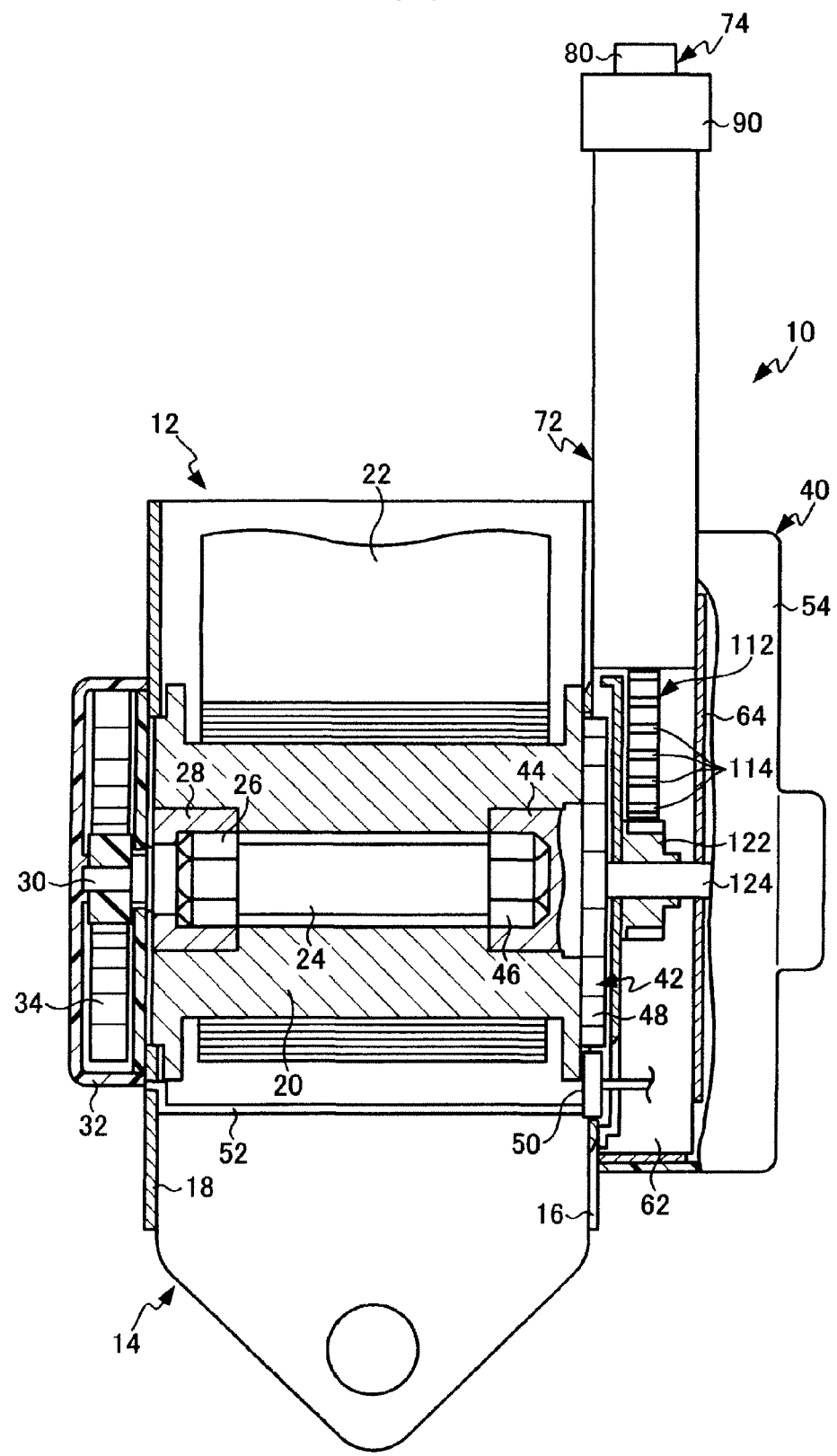
FIG. 3 is a schematic, front section view of the webbing winding device using the pretensioner according to the first embodiment of the invention.

FIG. 3 shows an outline of a configuration of a webbing winding device 12 of a seatbelt device using a pretensioner 10 according to a first embodiment of the invention.

As shown in the figure, the webbing winding device 12 has a frame 14 fixed to a skeletal member of a vehicle or a reinforcement member for reinforcing such a skeletal member by a fastener such as bolt. The frame 14, for example, has a pair of leg plates 16 and 18 opposed to each other in a back and forth direction of the vehicle. A spool 20 is provided between the leg plates 16 and 18. The spool 20 is formed into a cylindrical shape having an axial direction being along a facing direction of the leg plates 16 and 18, and is latched with a base end of a long and narrow webbing belt 22 at the middle in the axial direction. The spool 20 is rotated in a winding direction as one direction about an axis thereof, and thus winds the webbing belt 22 in layers from a base end of the belt.

The spool 20 made to be hollow along a central axis thereof, and a torsion shaft 24 as an energy absorbing unit is accommodated coaxially to the spool 20. The torsion shaft 24 is formed into a rod-like shape along the central axis of the spool 20 in a longitudinal direction (an axial direction) of the shaft, and a spool-side connection 26 is formed at an end on a leg plate 18 side of the shaft. An outer circumferential shape of the connection 26 is formed into a noncircular shape such as polygon or star shape as viewed along the axial direction of the shaft 24.

An adapter 28 is inserted, in correspondence to the connection 26, to the spool 20 from an open end on a leg plate 18 side of the spool coaxially to the spool 20. The adapter 28 is formed into a bottomed cylindrical shape that is opened toward a side of the leg plate 16 along the axial direction of the spool 20, and an inner circumferential shape of the adapter is formed into a noncircular shape so as to allow insertion of the connection 26 thereto. Therefore, while the connection 26 is inserted to the adapter 28, relative rotation of the torsion shaft 24 about the central axis of the shaft 24 is not allowed with respect to the adapter 28.

Moreover, an outer circumferential shape of the adapter 28 is formed into a noncircular shape such as polygon or star shape, and a shape of an opening (inner circumferential shape) on the leg plate 18 side of the spool 20, the opening being inserted with the adapter 28, is formed into a noncircular shape in correspondence to the outer circumferential shape of the adapter 28. Therefore, relative rotation of the adapter 28 about the central axis of the spool 20 is not allowed with respect to the spool 20, and consequently relative rotation of the torsion shaft 24 is not allowed with respect to the spool 20. In FIG. 3, from the adapter 28, a shaft 30 is extended to a side opposite to a leg plate 16 side in a coaxial manner to the spool 20. The shaft 30 penetrates the leg plate 18, and enters a spring case 32 attached to the leg plate 18 on the outside of the leg plate 18 (on a side opposite to a leg plate 16 side of the leg plate 18), and is rotatably supported by the spring case 32.

A spiral spring 34 as a spool urging tool is accommodated within the spring case 32. The spiral spring 34 is latched by the spring case 32 at an outer end in a spiral direction of the spring, and latched by the shaft 30 at an inner end in the spiral direction. When the shaft 30 is rotated in a drawing direction, the spiral spring 34 is wound and fastened, causing urging force of the spring 34. The urging force urges the shaft 30 in a winding direction. Since relative rotation of the adapter 28 is not allowed with respect to the spool 20 as above, when the webbing belt 22 is drawn out from the spool 20, and thus the spool 20 is rotated in the drawing direction, the urging force produced in the spring 34 urges the spool 20 in the winding direction, enabling winding of the webbing belt 22 on the spool 20.

A lock base 42 configuring a lock mechanism 40 is provided on a side of the leg plate 16 along the axial direction of the spool 20. A fitting portion 44 is formed on the lock base 42, and the fitting portion 44 is inserted to the spool 20 from an open end on the leg plate 16 side of the spool 20. An outer circumferential shape of the fitting portion 44 is formed into a circular shape as viewed along the axial direction of the spool 20, and since the fitting portion 44 is coaxially inserted to the spool from the open end on the leg plate 16 side, relative rotation of the fitting portion 44 (that is, lock base 42) is allowed about the central axis of the spool 20. The fitting portion 44 is formed into a cylindrical shape that is opened in a direction along the central axis of the spool 20. An inner circumferential shape of the fitting portion 44 is formed into a noncircular shape such as polygon or star shape up to an open end on a side of the leg plate 18 with respect to the middle of the fitting portion 44 along the axial direction of the spool 20.

A lock-base-side connection 46 is formed at an end of the torsion shaft 24 on a side opposite to a side of the spool-side connection 26. An outer circumferential shape of the connection 46 is formed into a noncircular shape so as to be insertable into the inside of the lock base 42. Therefore, while the connection 46 is inserted to the fitting portion 44, relative rotation of the torsion shaft 24 is not allowed with respect to the fitting portion 44 (that is, lock base 42) about the central axis of the shaft 24.

On the other hand, a ratchet 48 is provided on the lock base 42 on the outside of the spool 20 with respect to the open end on the leg plate 16 side of the spool 20. In the embodiment, the ratchet 48 is formed as an external-gear ratchet wheel, and formed coaxially and integrally to the fitting portion 44. A lock pawl 50 is provided on a lateral side of the ratchet 48 along a rotational radius direction of the lock base 42.

A leg plate 18 side portion of the lock pawl 50 along the axial direction of the spool 20 is supported by the leg plate 18 in a manner of being rotatable by a shaft 52 with respect to the leg plates 16 and 18 and other members about an axis having the same axial direction as the axial direction of the spool 20. The lock pawl 50 turns so that a tip thereof approaches or leaves the periphery of the ratchet 48 (lock pawl 50), and when the lock pawl 50 turns in a direction of approaching the periphery of the ratchet 48 (lock pawl 50), the tip of the lock pawl 50 is engaged with ratchet teeth formed on the periphery of the ratchet 48. While the tip of the lock pawl 50 is engaged with the ratchet teeth formed on the periphery of the ratchet 48, rotation in a drawing direction of the ratchet 48 (lock pawl 50) is restricted.

A housing 54 of the lock mechanism 40 is attached to the leg plate 16 on an outer side of the leg plate 16 (a side opposite to a leg plate 18 side of the leg plate 16). The housing 54 accommodates various members therein, which moves the ratchet 48 to the outside in a rotation radius direction of the spool 20 (that is, various members configuring the lock mechanism 40) when the spool 20 is suddenly rotated in the drawing direction, or when a vehicle goes into a rapid deceleration state. The members interlock with one another, so that when the spool 20 is suddenly rotated in the drawing direction, or when a vehicle goes into a rapid deceleration state, rotation in the drawing direction of the lock base 42, and in turn rotation in the drawing direction of the spool 20 may be restricted.

Figure 1:
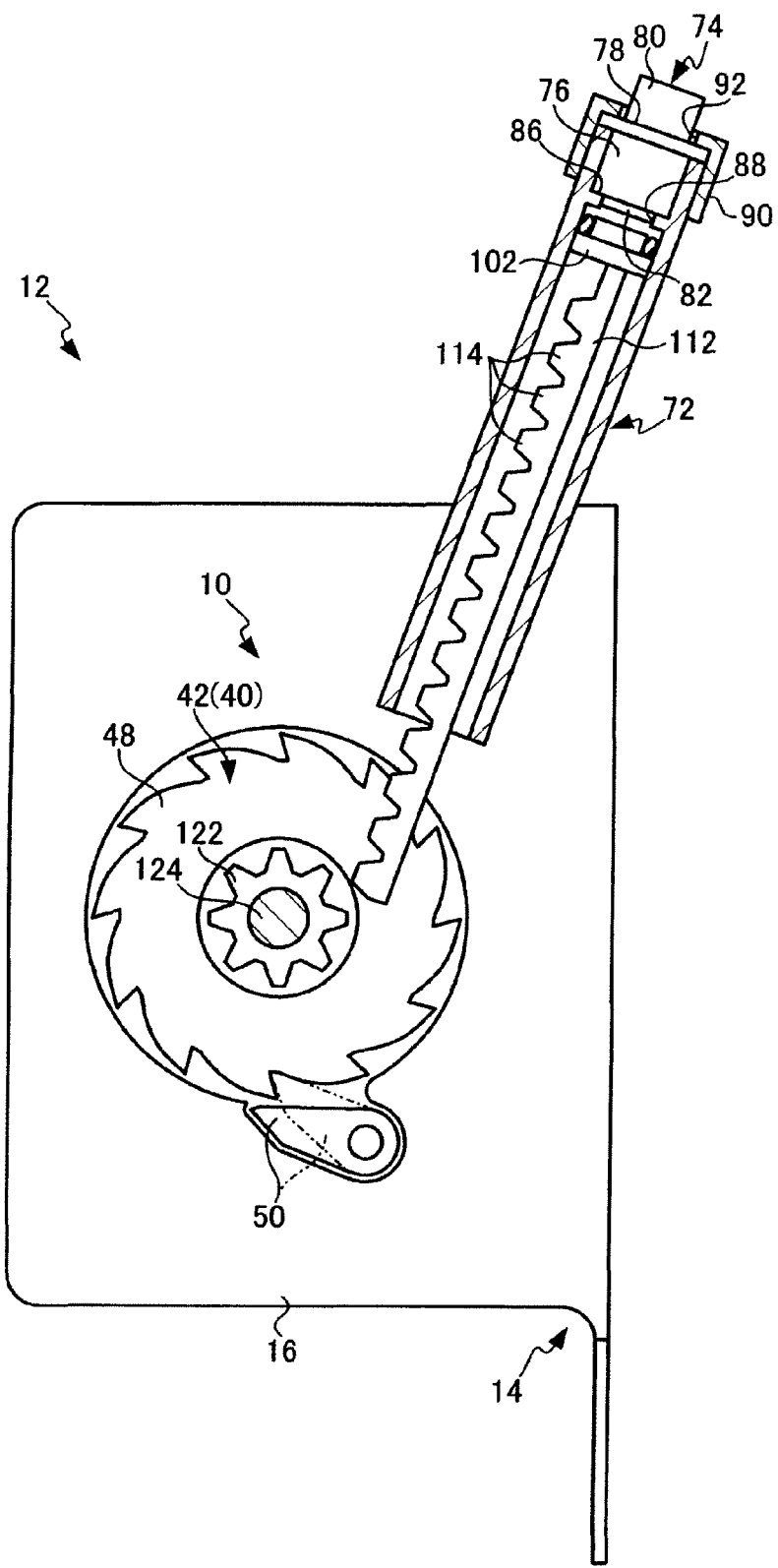
FIG. 1 is a schematic side view of a webbing winding device using a pretensioner according to a first embodiment of the invention.

A cover plate 62 of the pretensioner 10 is provided on the inside of the housing 54. The cover plate 62 has a wall 64 having a thickness direction being along a thickness direction of the leg plate 16, and is fixed to the leg plate 16 by a screw, a bolt and the like in such a manner that a wall surface of the wall 64 is separated from the leg plate 16. A cylinder 72 configuring the pretensioner 10 is provided between the wall 64 of the cover plate 62 and the leg plate 16. As shown in FIG. 1, the cylinder 72 is formed into a cylindrical shape (tube shape) having an axial direction thereof being along a direction perpendicular to the axial direction of the spool 20.

A gas generator 74 as a gas generation unit is provided on one end side in an axial direction of the cylinder 72. The gas generator 74 has a circular generator body 76 having a circular, outer circumferential shape in correspondence to an inner circumferential shape of the cylinder 72. The generator body 76 is made to be hollow, within which a gas generating agent that may momentarily generate gas by burning the agent, an igniting agent for igniting the gas generating agent, and an ignition device for ignition of the igniting agent.

A flange 78 is formed at an end of the generator body 76 on a one end side in the axial direction of the cylinder 72. The flange 78 is formed into a disk shape of which the outer diameter dimension is equal to or more than an inner diameter dimension of the cylinder 72 and equal to or less than an outer diameter dimension thereof, and formed coaxially to the generator body 76. As shown in FIG. 1, the generator body 76 of the gas generator 74 is inserted to the cylinder 72 from the one end in the axial direction of the cylinder 72. When the generator body 76 is inserted to the cylinder 72 in this way, the flange 78 abuts the one end in the axial direction of the cylinder 72.

A connection section 80 is formed on the flange 78 on a side opposite to a side of the generator body 76. The connection section 80 has an outer circumferential shape of which the outer diameter dimension is sufficiently smaller than an outer diameter dimension of the generator body 76. A connector, which is electrically connected to the ignition device accommodated in the generator body 76, is provided in the connection section 80, and the connector is directly or indirectly connected with a control unit such as ECU via a cable having one end connected to the connector. The control unit is electrically connected to a vehicle rapid-deceleration detection unit such as an acceleration sensor for detecting acceleration of a vehicle. When an electric signal from the vehicle rapid-deceleration detection unit, which has detected a vehicle rapid-deceleration state, is inputted into the control unit, the control unit outputs a ignition signal. When the ignition device accommodated in the generator body 76 is inputted with the ignition signal from the control unit, the ignition device ignites the ignition agent. The ignited ignition agent ignites the gas generating agent, and thus the gas generating agent is burned, causing momentary gas generation.

Figure 4:
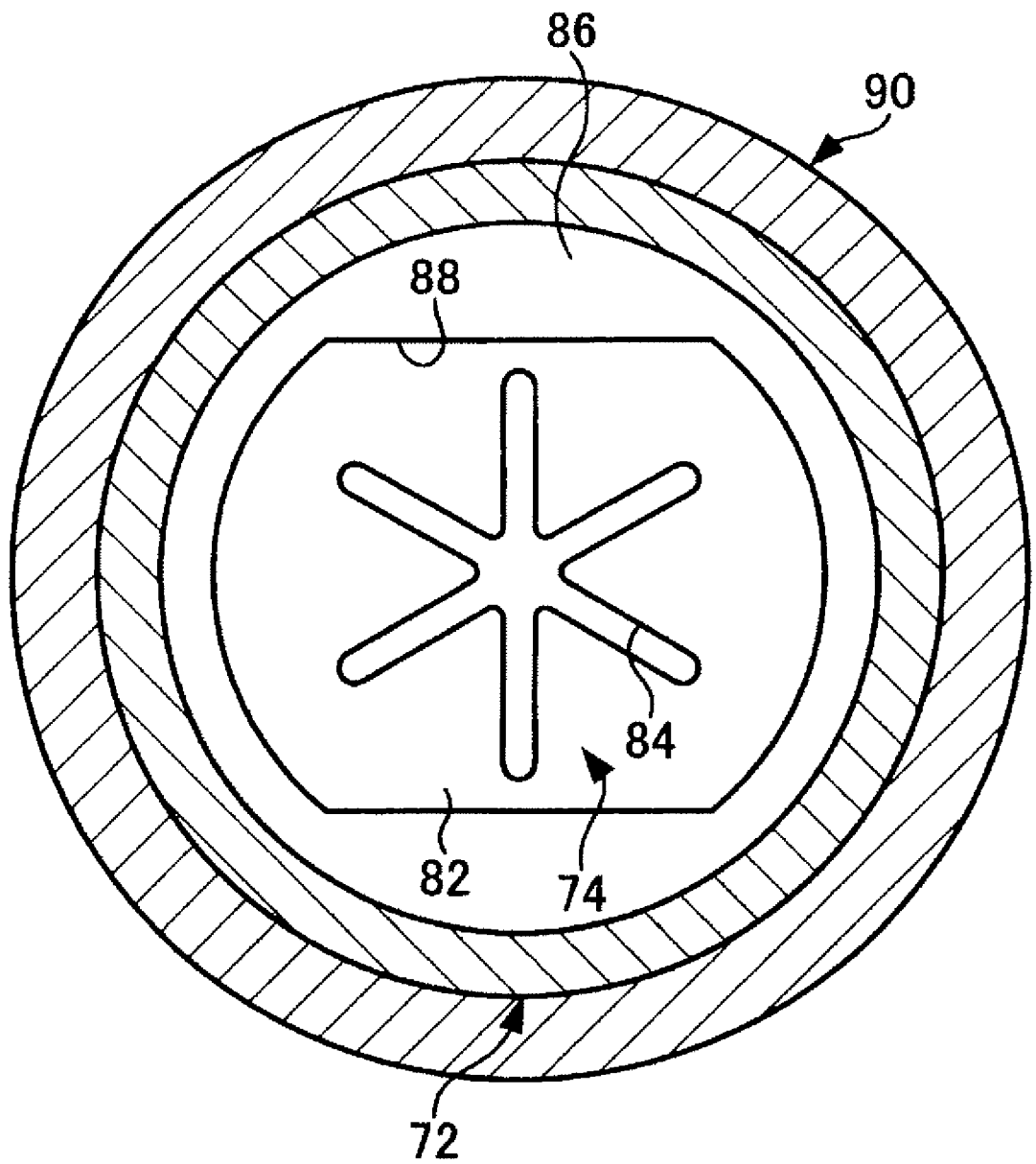
FIG. 4 is a section view of a cylinder.

A gas blowing section 82 is formed on the generator body 76 on a side opposite to a side of the flange 78 of the body 76. As shown in FIG. 4, the gas blowing section 82 has an outer circumferential shape formed into an oval shape (more particularly, a shape given by cutting two sides of a circle (a center of the circle is located between the two sides) in parallel). In the gas blowing section 82, a radial gas blow hole 84, which is opened toward a side opposite to a side of the body 76, and the inside of the gas blowing section 82 communicates with the outside of the section 82 (the inside of the cylinder 72 when the body 76 is inserted to the cylinder 72) via the gas blow hole 84. The inside of the gas blowing section 82 communicates with the inside of the body 76. Therefore, gas generated by combustion of the gas generating agent in the body 76 is exhausted to the outside of the gas generator 74 (the inside of the cylinder 72 when the body 76 is inserted to the cylinder 72) through the inside of the gas blowing section 82 and the gas blow hole 84.

A positioning portion 86 as a restriction portion and/or a high-strength portion is formed on an inner circumferential portion of the cylinder 72 in correspondence to the gas blowing section 82. The positioning portion 86 is formed into a plate shape having a thickness direction being approximately along an axial direction of the cylinder 72, and is extended from the inner circumferential portion of the cylinder 72 toward a center axis of the cylinder 72. The cylinder 72 basically has a cylindrical shape having a uniform thickness. However, the cylinder 72 has a thickness from an outer circumferential portion of the cylinder 72 to an end of the positioning portion 86 at an axis side of the cylinder 72 in a region where the positioning portion 86 is formed, so that the cylinder 72 is large in thickness in the region compared with any other region (where the positioning portion 86 is not formed) of the cylinder 72.

A fitting hole 88 is formed in the positioning portion 86. The fitting hole 88 is a through-hole so as to communicate one end side of the cylinder 72 to the other end side of the cylinder 72 with respect to the positioning portion 86, and has an inner circumferential shape being the same as an outer circumferential shape of the gas blowing section 82 formed in the gas generator 74 (strictly, a substantially similar figure being slightly larger than the outer circumferential shape of the gas blowing section 82). As shown in FIG. 1, when the generator body 76 is inserted to the cylinder 72 until the flange 78 abuts the one end of the cylinder 72 in a state in which the gas blowing section 82 and the fitting hole 88 are in the same phase about a central axis of the cylinder 72, the gas blowing section 82 is inserted to the fitting hole 88.

As described above, the gas blowing section 82 has a noncircular shape, and the inner circumferential shape of the fitting hole 88 is the same as the outer circumferential shape of the gas blowing section 82. Therefore, when the gas generator 74 is tried to be rotated about the central axis of the cylinder 72 while the gas blowing section 82 is entered (fitted) in the fitting hole 88, an inner circumferential portion of the fitting hole 88 interferes with an outer circumferential portion of the gas blowing section 82. Therefore, the gas generator 74 may not be rotated while the gas blowing section 82 is entered in the fitting hole 88.

A cap 90 is provided at the one end of the cylinder 72. The cap 90 is formed into a bottomed cylindrical shape opened toward a side of the other end in the axial direction of the cylinder 72. A female screw (omitted to be shown in the drawings) is formed on an inner circumferential portion of the cap 90, the female screw being able to be screwed with a male screw (omitted to be shown in the drawings) formed on an outer circumferential portion of the cylinder 72 near the one end of the cylinder 72. The female screw on the inner circumferential portion of the cap 90 is screwed with the male screw on the cylinder 72, thereby the cap 90 is mounted on the one end of the cylinder 72.

A circular hole 92 is formed in a bottom of the cap 90, the hole 92 having an inner diameter dimension being larger than an outer diameter dimension of the connection section 80, and smaller than an outer diameter dimension of the flange 78. When the cap 90 is mounted on the cylinder 72 while the gas generator 74 is mounted in the one end of the cylinder 72, the connection section 80 projects through the hole 92 to a side opposite to a cylinder side with respect to the bottom of the cap 90. In addition, the flange 78 is tightly sandwiched by the one end of the cylinder 72 and the bottom of the cap 90, so that the gas generator 74 is fixed to the cylinder 72.

A piston 102 is accommodated inside the cylinder 72 on a side of the other end of the cylinder 72 with respect to the positioning portion 86 in a slidable manner along the central axis of the cylinder 72. A rack bar 112 as a tension adding unit is formed at an end on a side opposite to a side of the fitting hole 88 of the piston 102. The rack bar 112 is formed into a narrow plate shape whose longitudinal direction is along a central axis direction of the cylinder 72, and whose thickness direction is along the axial direction of the spool 20, and integrally connected to the piston 102 at a base end in the longitudinal direction of the rack bar 112. Rack teeth 114 are formed at one end in a width direction of the rack bar 112.

A pinion gear 122 is provided on a lateral side of a tip end of the rack bar 112 in an initial state (that is, before the pretensioner 10 is activated). The pinion gear 122 is coaxially and integrally mounted on a shaft 124 extended from an end face on a side opposite to a side of the fitting portion 44 of the ratchet 48 coaxially to the ratchet 48 (that is, coaxially to the spool 20).

As shown in FIG. 1, the rack teeth 114 of the rack bar 112 are not engaged with the pinion gear 122 in an initial state of the pretensioner 10, and therefore even if the pinion gear 122 is rotated in either of the drawing direction and the winding direction, the pinion gear 122 is not engaged with the rack teeth 114 in the state. When the piston 102 slides to a side of the other end in the axial direction of the cylinder 72 (that is, a side opposite to a side where the gas generator 74 is provided), the rack teeth 114 of the rack bar 112 are engaged with the pinion gear 122, so that the pinion gear 122 is rotated in the winding direction.

In the configuration of the embodiment, the pinion gear 122 is mounted on the shaft 124 coaxially and integrally to the shaft. However, a configuration is also used, the configuration including such a clutch unit that the pinion gear 122 may be mounted on the shaft 124 coaxially and relatively rotatably to the shaft, and the pinion gear 122 is integrally connected to the shaft 124 only when the pinion gear 122 is rotated in a winding direction. When such a configuration is used, the rack teeth 114 may be engaged with the pinion gear 122 in an initial state of the pretensioner 10.

Description on Method of Manufacturing Cylinder 72

Next, summary of a method of manufacturing the cylinder 72 configuring the pretensioner 10 is described.

A manufacturing process of the cylinder 72 includes a forging step. The forging step includes a cylindrical body (tube body) formation step as shown in FIGS. 5A and 5B. In the cylindrical body formation step, a die 132 and a punch 134 as shown in FIG. 5A are used. The die 132 is formed such that it has a bottom portion and one end thereof being opened, and inner circumferential shape is a circular. A core 136 having a cylinder shape (circular rod shape) is protrusively provided from the center of the bottom portion of the die 132 toward an open end side of the die 132. On the other hand, the punch 134 is formed into a cylinder shape (circular rod shape) having an outer diameter dimension being approximately the same as an outer diameter dimension of the core 136. While a metal-block molding material 138 is accommodated in the die 132, the molding material 138 is molded by forging by the punch 134 disposed coaxially with respect to the die 132 and the core 136. As shown in FIG. 5B, the molding material 138 is formed into a cylindrical (tube) shape, in which a plate-like partition 140 (node) which will become the positioning portion 86 is formed in the middle in an axial direction of the material 138, by the forging-molding.

Next, in a trim (punch) step shown in FIGS. 6A and 6B, a die 142 and a trim punch 144 are used as shown in FIG. 6A. The trim punch 144 is formed into a cylinder shape (circular rod shape) having an outer diameter dimension being approximately the same as an inner diameter dimension of the molding material 138 that has been molded into a cylindrical shape by the die 132 and the punch 134, and has a trimming portion 148 formed at a tip end of the trim punch 144. The trimming portion 148 has an outer circumferential shape being approximately the same as an inner circumferential shape of the above mentioned fitting hole 88, in which a projection dimension from the tip end of the trim punch 144 is equal to or larger than a thickness dimension of the partition 140.

The die 142 has an inner circumferential shape formed into a circular shape of which the inner diameter dimension is approximately equal to an outer diameter dimension of the molding material 138 that has been formed into a cylindrical shape by the die 132 and the punch 134. Furthermore, a core 150 is formed on a bottom of the die 142 coaxially to an inner circumferential portion of the die 142, an outer diameter dimension of the core 150 being approximately equal to an inner diameter dimension of an inner circumferential portion of the molding material 138 that has been formed into a cylindrical shape by the core 136. Furthermore, an accommodating portion 152 having a bottomed-hole shape, which is opened at a tip end of the core 150, is formed in the core 150. The accommodating portion 152 has an inner circumferential shape being approximately equal to an inner circumferential shape of the fitting hole 88, and has a depth equal to or more than the thickness of the partition 140.

In the trim step, the molding material 138 subjected to forging-molding in the cylindrical body formation step is accommodated into the die 142, and subjected to molding using the trim punch 144 in such a state. As shown in FIG. 6B, in such molding using the trim punch 144, a part of the partition 140 is trimmed by the trimming portion 148 formed on the tip end of the trim punch 144 so that a through hole is formed. Thus, the partition 140 is formed into the positioning portion 86 having the fitting hole 88.

A male screw is formed on the outer periphery of the molding material 138, which has been subjected to the forging-molding step including the above steps, near one end thereof. Thus, the cylinder 72 is formed.

Operation and Effects of the First Embodiment

Next, operation and effects of the present embodiment are described.

In the webbing winding device 12 using the pretensioner 10, while a passenger sitting on a vehicle seat wears the webbing belt 22 on its body, when the vehicle goes into a rapid deceleration state, or when the vehicle is rapidly decelerated, the passenger body, which tries to move to a vehicle front side due to inertia, suddenly pulls the webbing belt 22, thereby the spool 20 is suddenly rotated in the drawing direction. Then, components of the lock mechanism 40 accommodated in the housing 54 interlock to turn the lock pawl 50 in such a direction that a tip of the lock pawl 50 approaches an outer circumferential portion of the ratchet 48. When the tip of the lock pawl 50 is thus engaged with the teeth of the ratchet 48 as shown by an imaginary line (a two-dot chain line) in FIG. 1, rotation of the ratchet 48 (that is, lock base 42) is restricted in a drawing direction.

The fitting portion 44 of the lock base 42 is fitted in the spool 20 in such a manner that relative rotation thereof is allowed with respect to the spool 20, but is not allowed with respect to the lock-base-side connection 46 of the torsion shaft 24. In addition, the spool-side connection 26 of the torsion shaft 24 may not relatively rotate with respect to the adapter 28, and furthermore the adapter 28 may not relatively rotate with respect to the spool 20, therefore relative rotation of the lock base 42 is not basically allowed with respect to the spool 20. In this way, rotation in the drawing direction of the lock base 42 is restricted, and thereby rotation in the drawing direction of the spool 20 is restricted. Therefore, the webbing belt 22 may not be drawn from the spool 20. Thus, when the vehicle is rapidly decelerated, the passenger body, which tries to move to a vehicle front side due to inertia, may be held by the webbing belt 22.

Next, a vehicle rapid-deceleration detection unit such as an in-vehicle acceleration sensor detects rapid deceleration of the vehicle (for example, sudden stop of the vehicle) based on the above condition. At that time, when a detection signal outputted from the rapid-deceleration detection unit is inputted to a control unit such as ECU controlling the pretensioner 10, the control unit outputs ignition signal. The ignition signal outputted from the control unit is inputted to the ignition device accommodated in the generator body 76, and then the ignition device inputted with the ignition signal ignites the ignition agent. The ignited ignition agent ignites a gas-generating agent, and thus the gas-generating agent is burned, leading to abrupt gas generation.

The gas generated through combustion of the gas-generating agent is exhausted from the gas blow hole 84 formed in the gas blowing section 82 to the outside, that is, to the inside of the cylinder 72 through the inside of the generator body 76 and the inside of the gas blowing section 82. When the gas is exhausted to the inside of the cylinder 72 in this way, internal pressure of the cylinder 72 is momentarily increased, so that the piston 102 slides the cylinder 72 to the other end side of the cylinder 72, that is, to a side opposite to a side where the gas generator 74 is provided.

Figure 2:
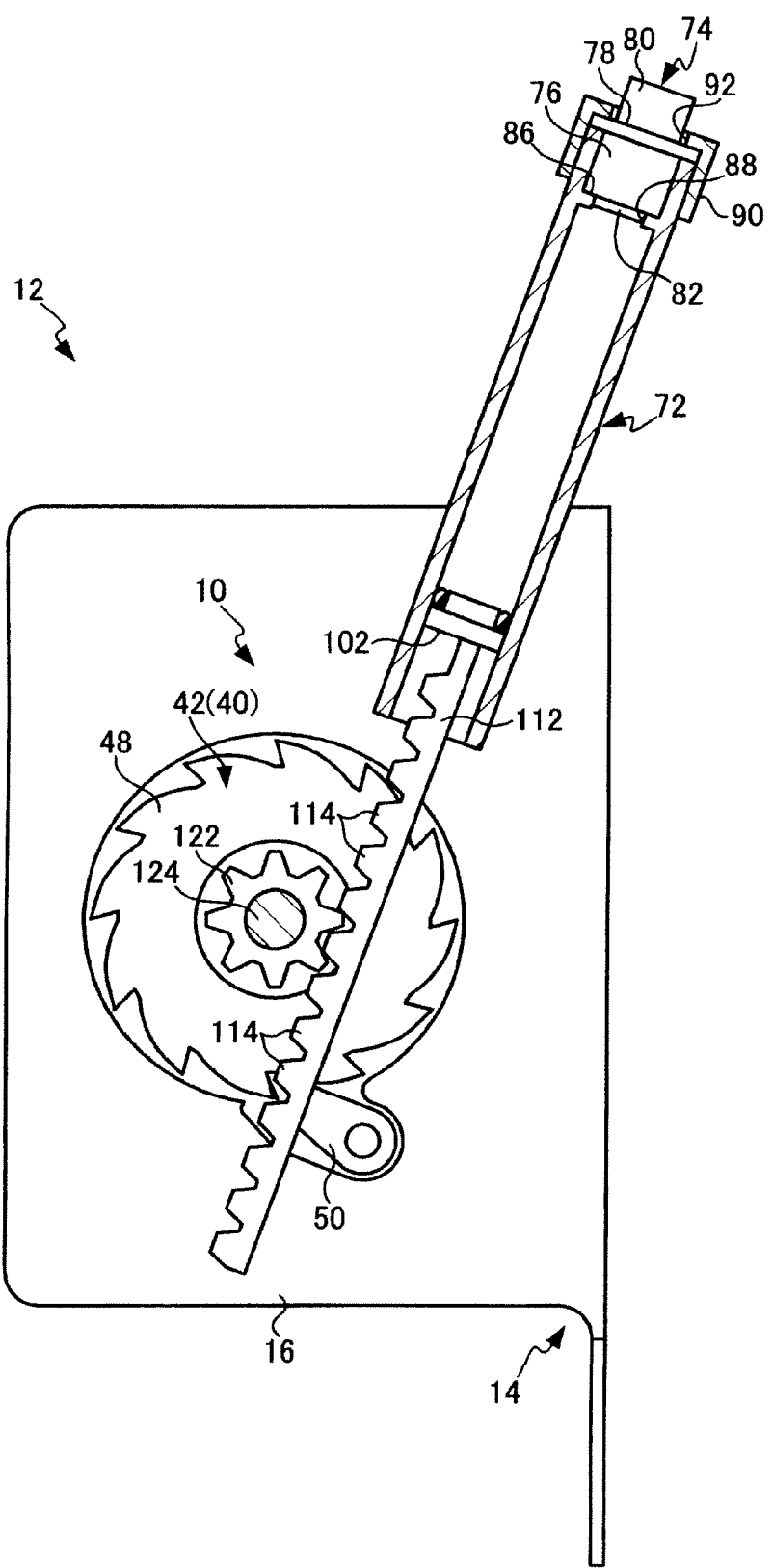
FIG. 2 is a side view corresponding to FIG. 1, showing the pretensioner being activated.

When the piston 102 slides in this way, the rack bar 112 integral with the piston 102 extends to the outside of the cylinder 72 from the other end of the cylinder 72. Thus, as shown in FIG. 2, the rack teeth 114 of the rack bar 112 are engaged with the pinion gear 122, and forcibly rotate the pinion gear 122 in the winding direction. The pinion gear 122 is connected to the spool 20 via the shaft 124, the lock base 42, the torsion shaft 24, and the adapter 28 in a manner of being not allowed to relatively rotate with respect to the spool 20. Therefore, the pinion gear 122 is forcibly rotated in the winding direction, causing forcible rotation of the spool 20 in the winding direction, so that the webbing belt 22 is wound on the spool 20 from a base end in a longitudinal direction of the belt.

Thus, a passenger body is further strongly held, and even if vehicle rapid-deceleration state further occurs, the passenger body may be prevented or effectively suppressed from inertially moving to the vehicle front side.

When the pretensioner 10 is activated, gas generated in the generator body 76 is exhausted from the gas blow hole 84 of the gas blowing section 82 as described above. In an initial state of the pretensioner 10, since the piston 102 is located near the one end of the cylinder 72 compared with in a state after the pretensioner has been activated, capacity of the cylinder 72 between the piston 102 and the gas blowing section 82 is minimized. In such a state, gas abruptly exhausted into a space between the piston 102 and the gas blowing section 82 presses the piston 102 toward the other end side of the cylinder 72, and the gas strongly presses the inner circumferential portion of the cylinder 72 radially outwardly in a direction perpendicular to a through (penetration) direction of the cylinder 72.

The pretensioner 10 of the embodiment has the positioning portion 86, which is formed on a part of a region, where the gas pressure immediately after the pretensioner 10 has been activated, in the inner circumferential portion of the cylinder 72. The cylinder 72 has a large wall thickness in the region where the positioning portion 86 is formed compared with other regions of the cylinder 72. Therefore, sufficient strength can be ensured against strong gas pressure immediately after the pretensioner 10 is activated.

In addition, when the piston 102 is slid by the gas pressure, capacity of the cylinder 72 increases between the piston 102 and the gas blowing section 82. Therefore, as the piston 102 is slidably moved, gas pressure is gradually decreased compared with gas pressure immediately after the pretensioner 10 is activated. This allows low mechanical strength of the cylinder on the other end side of the cylinder 72 with respect to a position of the piston 102 in the initial state of the pretensioner 10 compared with that in the region where gas pressure is applied immediately after the pretensioner 10 has been activated.

In the pretensioner 10, the cylinder 72 is molded by forging as mentioned above, and the cylinder 72 has a small thickness on the other end side of the cylinder 72 with respect to a region where the positioning portion 86 of the cylinder 72 is formed, compared with in the region of the positioning portion 86. Therefore, the thickness of the cylinder 72 on the other end side with respect to the region, in which the positioning portion 86 of the cylinder 72 is formed, is set to a thickness to the degree withstanding the gas pressure, which gas pressure is reduced compared with gas pressure immediately after the pretensioner 10 is activated as described above, thereby the cylinder 72 can be reduced in weight, consequently the pretensioner 10, and the webbing winding device 12 can be reduced in weight.

Furthermore, as described above, since the cylinder 72 is molded by forging, an inner diameter dimension of the cylinder 72 or thickness of the positioning portion 86 can be changed without changing an outer diameter dimension of the cylinder. Therefore, for example, even if gas generators 74 which are different in gas generating amount or gas pressure depending on a vehicle type are used, a sufficient strength to withstand the gas pressure can be ensured by the wall thickness of the cylinder 72 or thickness of the positioning portion 86 being changed without changing an outer diameter dimension of the cylinder 72.

In addition, since the cylinder 72 is molded by forging, increase in strength of the entire cylinder 72 can be expected due to work hardening caused by forging-molding. Therefore, reduction in thickness of the cylinder 72 can be achieved, leading to further reduction in material cost or reduction in weight of the cylinder 72.

Furthermore, the outer diameter dimension of the cylinder 72 may not be changed as above, which means that even if a specification of the gas generator 74 is changed, the cylinder 72 is mounted in the webbing winding device 12 in the same way, and a relative positional relationship of the cylinder 72 with respect to members (other than the cylinder 72) configuring the webbing winding device 12 is not changed. Therefore, a webbing winding device 12 having the same configuration can be used regardless of the specification of the gas generator 74, leading to cost reduction.

The cylinder 72 is molded by forging. Since the molding material 138 for forging is inexpensive compared with a stainless pipe member, material cost can be reduced. In addition, since the positioning portion 86 can be molded during forging-molding for molding the entire cylinder 72, cost can be reduced even in this regard.

Moreover, an inner diameter dimension of the cylinder 72 can be changed on the one end side of the cylinder with respect to the positioning portion 86 without changing an outer diameter dimension of the cylinder 72 and/or an inner diameter dimension of the cylinder 72 on the other end side of the cylinder with respect to the positioning portion 86. Therefore, even if an outer diameter dimension of the generator body 76 is changed due to difference in specification of the gas generator 74, an outer diameter dimension of the cylinder 72 may not be changed as described above, and consequently a webbing winding device 12 having the same configuration may be still used regardless of the specification of the gas generator 74, leading to cost reduction.

Furthermore, since the cylinder 72 is molded by forging, an inner diameter dimension of the cylinder 72 can be changed on the one end side of the cylinder with respect to the positioning portion 86 without changing an outer diameter dimension of the cylinder 72, and/or an inner diameter dimension of the cylinder 72 on the other end side of the cylinder with respect to the positioning portion 86. Therefore, even if an outer diameter dimension of the generator body 76 is changed due to difference in specification of the gas generator 74, an outer diameter dimension of the cylinder 72 may not be changed as described above, and consequently a webbing winding device 12 having the same configuration may be still used regardless of the specification of the gas generator 74, leading to cost reduction.

In addition, since the inner diameter dimension of the cylinder 72 on the other end side of the cylinder with respect to the positioning portion 86 can not be changed as described above, the piston 102 can be commonly used regardless of the specification of the gas generator 74, leading to further reduction in cost.

Moreover, as described above, even if the positioning portion 86 is formed in the cylinder 72, the outer diameter dimension of the cylinder 72 is not changed. In addition, since the positioning portion 86 is formed from the partition 140 which is formed from an excess material (material other than material forming the main body of the cylinder 72) during forging-molding of the cylinder 72. Therefore, a specification of the positioning portion 86, including a forming position of the positioning portion 86, an extension dimension of the positioning portion 86 from the inner circumferential portion of the cylinder 72, and furthermore thickness of the positioning portion 86 along a through direction of the cylinder 72, can be varied without changing an outer circumferential shape of the cylinder 72. Thus, since a specification of the frame 14 to be assembled with the cylinder 72, or a specification of the cover plate 62 can be commonly used for cylinders 72 being different in specification of the positioning portion 86, the pretensioner may be widely used, and cost can be reduced even in this regard.

Configuration of the Second Exemplary Embodiment

Next, the second embodiment of the present invention is described. Note that, for explanation of the present embodiment, the basically same parts as those of the first embodiment will be denoted by the same reference numerals, and a detailed description thereof will be omitted.

Figure 7:
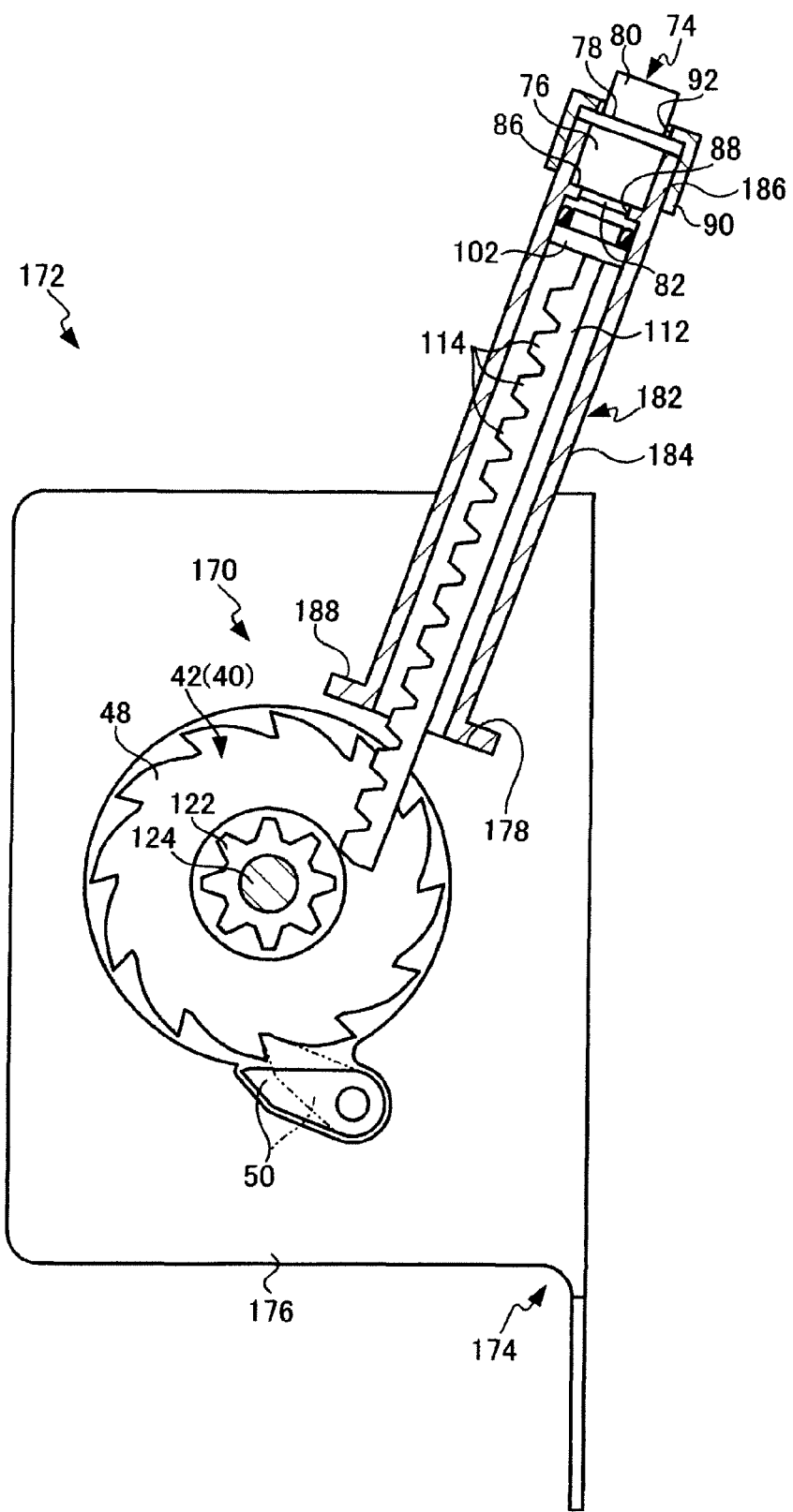
FIG. 7 is a schematic side view of a webbing winding device using a pretensioner according to a second embodiment of the invention.

FIG. 7 is a schematic side view of a webbing winding device 172 using a pretensioner 170 according to the present embodiment. As shown in this figure, the webbing winding device 172 is not equipped with the frame 14, and is equipped with a frame 174 instead. The frame 174 is not equipped with the leg plate 16, and is equipped with a leg plate 176 instead. The leg plate 176 is basically the same as the leg plate 16 of the frame 14 in the first embodiment, but differs in the structure from the leg plate 16 in that a positioning hole 178 is formed. The positioning hole 178 is formed into a slit with the shape of the opening thereof being substantially rectangular, and passes through in the thickness direction of the positioning hole 178.

The pretensioner 170 of the present embodiment is not equipped with the cylinder 72, and is equipped with a cylinder 182 instead. The cylinder 182 is the same as the cylinder 72 of the first embodiment in that the positioning portion 86 is provided.

Further, a cylinder body 184 is provided on the cylinder 182 at a side opposite to the gas generator 74 with respect to the positioning portion 86. On the other hand, a portion of the cylinder 182 at the gas generator 74 side with respect to the positioning portion 86 is formed as a thick-walled cylindrical portion 186 that is another aspect of the high-strength portion. The outer diameter dimension of the thick-walled cylindrical portion 186 is set to be equal to the outer diameter dimension of the cylinder body 184. However, the inner diameter dimension of the thick-walled cylindrical portion 186 is smaller than the inner diameter dimension of the cylinder body 184. For this reason, the wall thickness of the cylinder 182 in a portion as the thick-walled cylindrical portion 186 is larger than the wall thickness of the cylinder 182 in a portion as the cylinder body 184. As a result, the mechanical strength of the thick-walled cylindrical portion 186 in the cylinder 184 is higher than the mechanical strength of the cylinder body 184.

In addition, a flange portion 188 is formed at the end portion of the cylinder body 184 at a side opposite to the positioning portion 86 side. The flange portion 188 is made to extend outward in the radial direction of the cylinder body 184 from the end portion of the cylinder body 184 (at the side opposite to the positioning portion 86 side). The thickness of the flange portion 188 (the dimension of the flange portion 188 along the axial direction of the cylinder body 184) is set to be larger than the wall thickness of the cylinder body 184. The above-described positioning hole 178 is formed so as to correspond to the flange portion 188, and the opening dimension of the positioning hole 178 in a direction perpendicular to the longitudinal direction of the opening hole is set to be slightly larger than the thickness dimension of the flange portion 188, and the flange portion 188 enters in the positioning hole 178 from the outside of the leg plate 176. Due to the flange portion 188 entering in the positioning hole 178 in this way, positioning of the cylinder 182 with respect to the frame 174, and also positioning of the pretensioner 170 is achieved.

<Description on Method of Manufacturing the Cylinder 182>

Next, a method of manufacturing the cylinder 182 constituting the pretensioner 170 is schematically described.

A manufacturing process of the cylinder 182 includes an upsetting forging step that is one embodiment of the forging step. As shown in FIGS. 8A and 8B, in the upsetting forging step, a die 192 and a punch 194 are used. The die 192 includes a molding material accommodating portion 196 formed therein. The molding material accommodating portion 196 is a bottomed hole and has an opening of circular shape, inner diameter dimension thereof being not more than the outer diameter dimension of the cylinder body 184. A molding material 198 for molding the cylinder 182 is accommodated within the molding material accommodating portion 196. The molding material 198 is entirely formed into a block having a circular rod shape whose outer diameter dimension is not more than the inner diameter dimension of the molding material accommodating portion 196. The capacity of the above-described molding material accommodating portion 196 is set to be smaller than the volume of the molding material 198. As shown in FIG. 8A, when the molding material 198 is accommodated inside the molding material accommodating portion 196, a part of the molding material 198 protrudes outside of the molding material accommodating portion 196 from the opening end of the molding material accommodating portion 196.

Further, the die 192 includes a flange forming portion 200 formed therein. The flange forming portion 200 is a circular bottomed hole, whose inner diameter dimension corresponds to the outer diameter dimension of the above-described flange portion 188, and whose depth is not less than the thickness of the molding material 198. The above-described molding material accommodating portion 196 is opened at the center of the flange forming portion 200.

When the molding material 198 is subjected to forging using the punch 194 in a state in which the molding material 198 is accommodated in the molding material accommodating portion 196 of the die 192, a portion of the molding material 198 protruding outer side of the molding material accommodating portion 196 is molded so as to correspond to the inner circumferential shape of the flange forming portion 200 while it spreads in a direction perpendicular to the opening direction of the molding material accommodating portion 196. Accordingly, as shown in FIG. 8B, a flange portion 188 is molded in the molding material 198 at the flange molding portion 200.

As described above, the molding material 198 that includes the flange portion 188 molded therein is further molded at a cylindrical body (tube body) formation step.

As shown in FIG. 9A, in the cylindrical body formation step, a die 202 and a punch 204 are used. The die 202 includes a cylindrical body forming portion 206 corresponding to the inner side of the die 132 in the first embodiment, and the molding material 198 is accommodated in the cylindrical body forming portion 206. Further, a core 208 is formed at the bottom portion of the cylindrical body forming portion 206. The core 208 is a portion that corresponds to the core 136 of the die 132 in the first embodiment, but the outer diameter dimension of the core 208 is smaller than the outer diameter dimension of the punch body 210 of the punch 210.

Moreover, a flange accommodating portion 212 is formed in the die 202. The flange accommodating portion 212 is a bottomed hole whose inner circumferential shape corresponds to the outer circumferential shape of the flange portion 188 and whose depth corresponds to the thickness dimension of the flange portion 188. The cylindrical body forming portion 206 is opened at the center of the bottom portion of the flange accommodating portion 212. In the state in which the molding material 198 is accommodated in the cylindrical body forming portion 206 and the flange portion 188 formed in the molding material 198 is accommodated in the flange accommodating portion 212, the molding material 198 is further molded by forging using the punch 204. As shown in FIG. 9B, the molding material 198 after having been further subjected to forging-molding is formed into a cylinder (tube) having a plate-shaped partition wall 140 (node) that will become a material of the positioning potion 86, in the intermediate portion of the molding material 198 in the axial direction.

Further, the outer diameter dimension of the core 208 formed in the die 202 is smaller than the outer diameter dimension of the punch body 210 of the punch 204 as described above, and therefore, the thickness of the thick-walled cylindrical portion 186 molded in the core 208 becomes larger than the wall thickness of the cylinder body 184 molded by the punch body 210.

Moreover, as long as the flange portion 188 is completely molded in the aforementioned upsetting forging step, the shape of the flange portion 188 is maintained due to unnecessary deformation of the flange portion 188 being regulated by the flange accommodating portion 212 in the cylindrical body formation step. To the contrary, when the flange portion 188 is in the middle of the molding operation (the molding of the flange portion 188 is not completed) at the above-described upsetting forging step, the flange portion 188 is molded into the final shape or a shape approximate to the final one by the flange accommodating portion 212 in the cylindrical body formation step.

Subsequently, a through hole is formed in the partition wall 140 of the molding material 198 by a trimming (punching) step shown in FIGS. 10A and 10B, whereby the positioning portion 86 having the fitting hole 88 is formed. In the trimming step, a die 222 and a punch 224 are used.

Figure 10A:
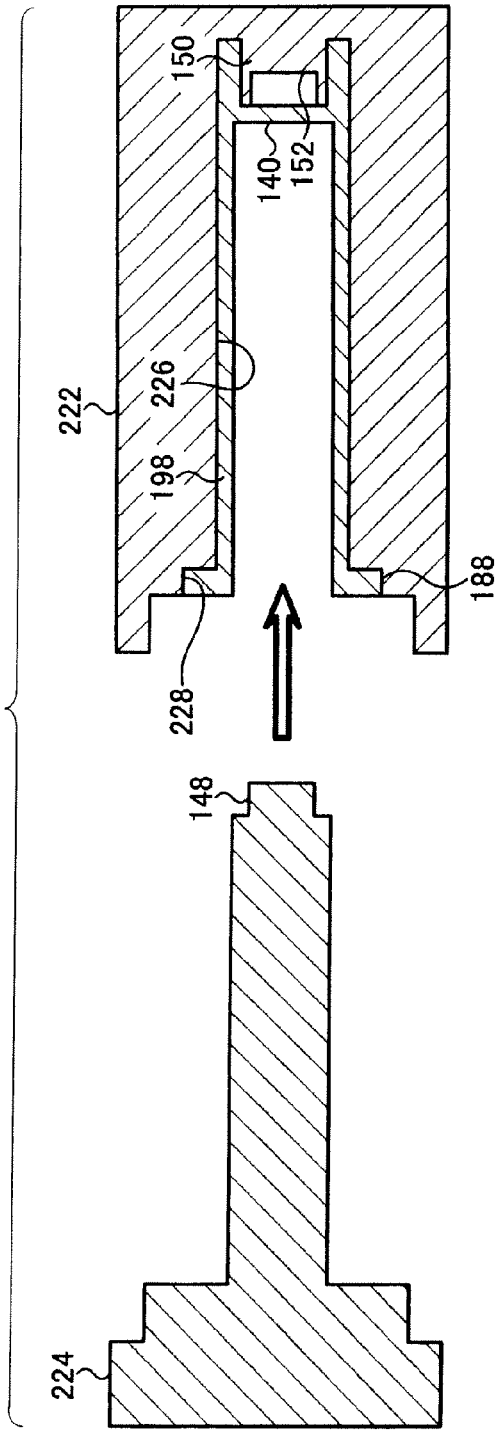
FIGS. 10A, 10B are view schematically showing a step of forming a regulation portion.
Figure 10B:
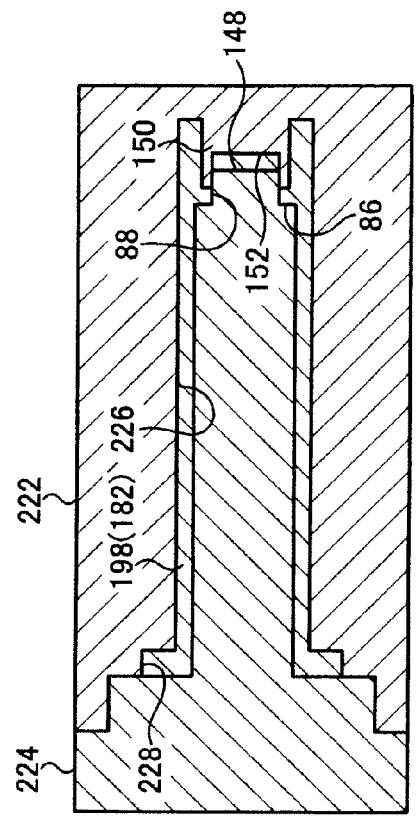

As shown in FIG. 10A, the die 222 includes the cylindrical body accommodating portion 226 corresponding to the inner side of the die 142 in the above-described first embodiment, and the core 150 having accommodating portion 152 is formed at the bottom portion of the cylindrical body accommodating portion 226, and further, the molding material 198 is accommodated at the inner side of the cylindrical body accommodating portion 226. A flange accommodating potion 228 is formed at the opening end side of the cylindrical body accommodating portion 226. The flange accommodating portion 228 is a bottomed hole with the inner circumferential shape thereof corresponding to the outer circumferential shape of the flange portion 188 and the depth thereof corresponding to the thickness dimension of the flange portion 188, and the cylindrical body accommodating portion 226 is opened at the center of the bottom portion of the flange accommodating portion 228.

Further, if the flange portion 188 is completely molded before the trim step, the shape of the flange portion 188 is maintained due to unnecessary deformation of the flange portion 188 being regulated by the flange accommodating portion 228 in the trim step. To the contrary, as long as the flange portion 188 is in the middle of the molding operation before the trim step, the flange portion 188 is molded into the final shape by the flange accommodating portion 228 in the trim step.

In the molding material 198 having being subjected to the forging-molding step including the aforementioned steps, a female screw is formed at the outer circumferential portion in the vicinity of the one end portion of the molding material, whereby the cylinder 182 is formed.

Operation and Effects of the Second Embodiment

Next, operation and effects of the second embodiment are described.

In the pretensioner 170 of the present embodiment, not only the wall thickness of the positioning portion 86, but also the wall thickness of the thick-walled cylindrical portion 186 are larger than the wall thickness of the cylinder body 184. Since the cylinder body 184 is mounted with the gas generator 74, strong gas pressure acts immediately after the pretensioner 170 starts to be activated, but the thick-walled cylindrical portion 186 can ensure sufficient strength against the strong gas pressure as mentioned above.

Further, in the pretensioner 170, the flange portion 188 is formed in the cylinder 182, and when the cylinder 182 of the pretensioner 170 is mounted on the frame 174 of the webbing winding device 172, positioning of the cylinder 182 with respect to the frame 174 can be easily achieved due to the flange portion 188 being fit in the positioning hole 178.

Moreover, the thickness of the flange portion 188 is set to be larger than the wall thickness of the cylinder body 184. For this reason, when the pretensioner 170 is activated, a sufficient strength can be ensured against reaction force or the like which the flange portion 188 receives from the edge of the positioning hole 178.

In addition, the flange portion 188 is formed in the above-described upsetting forging step, and therefore, the thickness of the flange portion 188 can be arbitrarily set. Consequently, the wall thickness of the cylinder body 184 can be made small while the thickness of the flange portion 188 is made large so as to impart sufficient strength to the flange portion 188 as described above, whereby the cylinder 182 is reduced in the weight thereof while the flange portion 188 having sufficient strength is formed, and the pretensioner 170 is also reduced in the weight thereof.

The pretensioner 170 of this embodiment basically has the same structure as that of the pretensioner 10 according to the above-described first embodiment except that the flange portion 188 is formed in the cylinder 182, and therefore, the operation other than operation that is specific to the pretensioner 170 having the flange portion 188 provided therein is the same as that of the pretensioner 10 of the first embodiment. Accordingly, the same effects as those of the pretensioner of the above-described first embodiment can be obtained.

Incidentally, the present embodiment provides a structure in which the flange portion 188 is formed at the end portion of the cylinder 182 (the end portion of the cylinder body 184 opposite to the thick-walled cylinder portion 186 side), but the position at which the flange portion 188 is formed is not limited to the same. Further, in the present embodiment, the outer circumferential shape of the flange portion 188 is circular, but it is not limited to the circular shape.

In other words, the flange portion 188 can be made to extend from an arbitrary position among from the both end portions and intermediate portion of the cylinder 182 by changing the structure of a mold die (metal mold) in the upsetting forging-molding, and further, the outer circumferential shape of the flange portion 188 can also be formed into a desired shape.

What is claimed is:

1. A pretensioner, comprising:
    a gas generation unit that is activated to generate gas;
    a cylinder that is formed into a cylindrical shape open at both ends, has the gas generation unit mounted thereto from one of the open ends, and is supplied with gas generated by the gas generation unit to the inside of the cylinder so that an internal pressure of the cylinder is increased, the cylinder having a high-strength portion that extends from an inner circumferential portion of the cylinder toward the center of the cylinder at a predetermined position between the one of the open ends and the other of the open ends such that a wall thickness of the cylinder is enlarged at the predetermined position; and
    a tension adding unit that is moved within the cylinder by gas pressure provided by the gas generation unit so as to increase a tension of a webbing belt configuring a seat-belt device,
    wherein the high-strength portion is formed near a gas blowing section of the gas generation unit through which gas is blown into the cylinder, the outer circumferential shape of the cylinder has the same shape from one of the open ends to the other of the open ends, and the cylinder is molded by the forging of molding material.

2. The pretensioner of claim 1, wherein a partition wall is formed by forging-molding at a position of the molding material corresponding to the predetermined position at the inside of the cylinder where the molding material is pressurized from at least one side of both sides of the molding material corresponding to the both ends of the cylinder, and the high-strength portion is formed from the partition wall.

3. The pretensioner of claim 1, wherein outer walls of the cylinder are continuous from one of the open ends to the other of the open ends.

4. A pretensioner, comprising:
    a gas generation unit that is activated to generate gas;
    a cylinder that is formed into a cylindrical shape open at both ends, has the gas generation unit mounted thereto from one of the open ends, and is supplied with gas generated by the gas generation unit to the inside of the cylinder so that an internal pressure of the cylinder is increased, the cylinder having a high-strength portion that extends from an inner circumferential portion of the cylinder toward the center of the cylinder at a predetermined position between the one of the open ends and the other of the open ends such that a wall thickness of the cylinder is enlarged at the predetermined position; and
    a tension adding unit that is moved within the cylinder by gas pressure provided by the gas generation unit so as to increase a tension of a webbing belt configuring a seat-belt device,
    wherein the high-strength portion is formed near a gas blowing section of the gas generation unit through which gas is blown into the cylinder, and the cylinder is molded by forging of molding material, and
    further comprising a flange portion that is formed to extend from an outer circumferential portion of the cylinder so as to engage with a region to which the cylinder is mounted, a thickness of the flange portion being set to be larger than a wall thickness of a cylindrical main body portion of the cylinder.

5. The pretensioner according to claim 4, wherein the flange portion is molded by upsetting forging before the cylinder is formed into a cylindrical shape.

6. The pretensioner of claim 1, wherein the high-strength portion includes a thick-walled portion formed at the one of the open ends where the gas generation unit is mounted, a wall thickness of the thick-walled portion being larger than a wall thickness of a cylindrical main body portion of the cylinder.

7. The pretensioner of claim 6, wherein an outer diameter of the thick-walled portion and an outer diameter of the cylindrical main body portion are the same, and an inner diameter of the thick-walled portion is smaller than an inner diameter of the cylindrical main body portion.

* * * * *